United States Patent
Brand et al.

(10) Patent No.: US 11,215,340 B2
(45) Date of Patent: Jan. 4, 2022

(54) CONNECTED LUMINAIRE

(71) Applicant: Schreder S.A., Brussels (BE)

(72) Inventors: Daniel Brand, Wedemark (DE);
Laurent Secretin, Rémicourt (BE);
Raoul Van Bergen, Bornheim (DE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 15/733,608

(22) PCT Filed: Mar. 18, 2019

(86) PCT No.: PCT/EP2019/056721
§ 371 (c)(1),
(2) Date: Sep. 15, 2020

(87) PCT Pub. No.: WO2019/175437
PCT Pub. Date: Sep. 19, 2019

(65) Prior Publication Data
US 2021/0041086 A1 Feb. 11, 2021

(30) Foreign Application Priority Data

Mar. 16, 2018 (BE) ..................... 20185175
Mar. 16, 2018 (BE) ..................... 20185177

(51) Int. Cl.
| | |
|---|---|
| *H05B 47/20* | (2020.01) |
| *F21V 15/01* | (2006.01) |
| *H05B 47/11* | (2020.01) |
| *H05B 47/19* | (2020.01) |
| *F21V 23/04* | (2006.01) |

(Continued)

(52) U.S. Cl.
CPC ............ *F21V 15/01* (2013.01); *F21V 23/045* (2013.01); *F21V 23/0464* (2013.01);
(Continued)

(58) Field of Classification Search
CPC .... F21V 15/01; F21V 23/045; F21V 23/0464; F21V 23/06; F21V 31/005;
(Continued)

(56) References Cited

U.S. PATENT DOCUMENTS 7,345,270 B1 * 3/2008 Jones ..................... H05B 47/19
250/2 UAL
2007/0252528 A1 * 11/2007 Vermuelen ............. H05B 47/19
315/34

(Continued)

FOREIGN PATENT DOCUMENTS

| EP | 2169647 A1 | 3/2010 |
|---|---|---|
| WO | 2006006135 A1 | 1/2006 |

(Continued)

OTHER PUBLICATIONS

PCT International Search Report and Written Opinion, PCT International Application No. PCT/EP2019/056721, dated Apr. 17, 2019.

*Primary Examiner* — Kurtis R Bahr
(74) *Attorney, Agent, or Firm* — McDonnell Boehnen Hulbert & Berghoff LLP

(57) ABSTRACT

The invention relates to a luminaire comprising a housing comprising an electrically nonconductive portion; a light source arranged in the housing; a light drive and control assembly and configured for driving said light source; a communication assembly arranged in the housing.

20 Claims, 6 Drawing Sheets

(51) Int. Cl.
*F21V 23/06* (2006.01)
*F21V 31/00* (2006.01)
*F21Y 115/10* (2016.01)
*F21W 131/103* (2006.01)

(52) U.S. Cl.
CPC .......... *F21V 23/06* (2013.01); *F21V 31/005* (2013.01); *H05B 47/11* (2020.01); *H05B 47/19* (2020.01); *H05B 47/20* (2020.01); *F21W 2131/103* (2013.01); *F21Y 2115/10* (2016.08)

(58) Field of Classification Search
CPC .......... F21W 2131/103; F21Y 2115/10; H05B 47/11; H05B 47/19; H05B 47/20
See application file for complete search history.

(56) References Cited

U.S. PATENT DOCUMENTS

| | | | |
|---|---|---|---|
| 2010/0188301 A1* | 7/2010 | Kishimoto | F21V 5/04 343/721 |
| 2011/0163668 A1* | 7/2011 | Jonsson | F21K 9/23 315/51 |
| 2011/0193484 A1* | 8/2011 | Harbers | F21K 9/60 315/129 |
| 2012/0040606 A1* | 2/2012 | Verfuerth | H05B 47/11 455/7 |
| 2013/0300318 A1* | 11/2013 | Kim | G08B 21/187 315/313 |
| 2014/0361934 A1* | 12/2014 | Ely | H01Q 1/24 343/702 |
| 2015/0351195 A1* | 12/2015 | Sargent | F21V 15/01 315/158 |
| 2016/0219674 A1* | 7/2016 | Brand | H05B 47/11 |
| 2018/0026329 A1* | 1/2018 | Johnson | F21V 23/009 343/721 |
| 2018/0035517 A1 | 2/2018 | Den Boer et al. | |
| 2018/0249563 A1* | 8/2018 | Alexander | F21V 21/14 |

FOREIGN PATENT DOCUMENTS

| | | |
|---|---|---|
| WO | 2015028067 A1 | 3/2015 |
| WO | 2015183566 A1 | 12/2015 |
| WO | 2017220690 A1 | 12/2017 |

* cited by examiner

CONNECTED LUMINAIRE

CROSS-REFERENCE TO RELATED APPLICATION

The present application is a national stage entry of PCT/EP2019/056721 filed on Mar. 18, 2019, which claims priority to BE 20185175, filed on Mar. 16, 2018, and BE 20185177, filed on Mar. 16, 2018, the contents of each of which are hereby incorporated by reference.

FIELD OF INVENTION

The field of invention relates to luminaires, in particular outdoor luminaires such as outdoor luminaires for streetlights capable of communicating with other devices.

BACKGROUND

WO 2015/028067 in the name of the Applicant describes a luminaire with a luminaire controller mounted within a luminaire head. The luminaire controller comprises a light sensor for providing a signal relating to ambient light levels, and a light guide having a light inlet through which ambient light can be received and a light outlet through which light is directed to the light sensor.

Further, the luminaire is provided with an antenna provided on an upper surface of the luminaire head. The luminaire controller is provided with a communications unit for communicating with the communications network. The signals from the light sensor may be passed to other controllers of other luminaires and used for controlling a group of luminaires.

In other prior art luminaires, the communication elements are provided in a control module which is connected through a socket connection with a housing of the luminaire. A drawback of such solutions is that the control module is a separate component protruding out of the housing, resulting in loss of space or in visually disturbing appearances.

SUMMARY

The object of embodiments of the invention is to provide an improved connected luminaire in which various communication functionalities are integrated in an improved manner in the luminaire compared to existing solutions.

According to a first aspect, there is provided a luminaire comprising a housing, a light source arranged in the housing, a light drive and control assembly, and a communication assembly arranged in the housing. The housing comprises an electrically nonconductive portion through which electrical signals can be received and transmitted. Preferably, the communication assembly comprises an antenna, a support substrate, and communication circuitry. The antenna is arranged and configured for receiving and/or transmitting communication signals through the electrically nonconductive portion. Optionally, a light sensor may be mounted on the support substrate, or may be mounted in or on the housing. The communication circuitry is mounted on the support substrate and configured for treating signals received by the antenna, and for communicating those signals to the light drive and control assembly, and for treating signals to be transmitted by the antenna. Preferably, the electrically nonconductive portion through which the signals are transmitted or received is connected in a socket-free manner with the rest of the housing.

By providing a communication assembly which is integrated in the housing of a luminaire as defined above, there is provided a compact integrated connected luminaire in which communication functionalities are adequately grouped. Compared to prior art solutions where the communication elements are provided in a module which is connected through a socket connection with the housing of a luminaire, embodiments of the invention have the advantage that the housing can be more compact whilst still allowing a good communication of data to and from the light drive and control assembly. Another benefit of such 'socketfree' embodiment is that we can offer control and communication capability with a high level of protection over water and/or mechanical impact at a lower cost compared to a control module being fitted on a socket and located on the top of the luminaire housing.

Also, by providing the housing with an electrically nonconductive portion through which electrical signals can be received and transmitted, and by integrating the communication assembly in the housing a truly connected luminaire is obtained, as compared to prior art solutions where providing a connected luminaire comprising communication functionalities was done by adding a separate control module outside the housing which is connected through a socket with components inside the housing. In other words, embodiments of a luminaire of the present invention are by default enabled to transmit and/or receive signals to/from the outside, wherein the housing of the luminaire is designed for receiving said communication functionalities, and the necessary electrical and/or electronic components for transmitting and/or receiving signals are provided by default to the luminaire.

According to an exemplary embodiment, the luminaire comprises a light sensor mounted on the support substrate, or mounted in or on the housing. The light sensor is configured for sensing a signal relating to ambient light levels. The communication circuitry may then be configured for treating signals received from the light sensor and for communicating those treated signals.

According to an embodiment, the light drive and control assembly comprises programmable control means configured for controlling and configuring the luminaire based on data in the received signals and/or data stored in the luminaire. The data may comprise various types of data used for configuring and controlling the luminaire, such as sensed data from neighboring luminaires, configuration profiles received from a central controller, diagnostics data, real time dimming data, etc. The data may relate to data for controlling dimming means, data for controlling the measurements performed by sensors, e.g. the at least one light sensor, etc. Said data may be received at a given frequency, e.g. once a day, from the outside, e.g. from remote server.

Also, the programmable control means may be configured for controlling the transmitting of data from the luminaire to the outside, e.g. to a remote server or a neighboring luminaire. For example, data sensed by a sensor of the luminaire may be transmitted at a given frequency, e.g. once a day.

According to a preferred embodiment, the light drive and control assembly comprises control means (optionally integrated with the previously mentioned programmable control means) which are configured for automatically collecting sensed data and/or diagnostics data and/or operational status data related to components of the luminaire, and the communication assembly is configured to transmit communication signals including said sensed data and/or said diagnostics data and/or said operating status data through the electrically nonconductive portion and to a remote device (either directly or indirectly through one or more other luminaires and/or gateways). In that manner, the luminaire can be sold as a "connected" luminaire, irrespective of whether a user/operator of the luminaire wishes to control the luminaire through a remote device. This will allow a luminaire manufacturer to analyze the operation, use and behavior of the luminaires based on the sensed data and/or diagnostic data and/or operational status data which is transmitted automatically by the "connected" luminaire to a remote server. More in particular, the control means may be preprogrammed and configured for automatically transmitting certain data to a remote server of the luminaire manufacturer. In that manner, the luminaire manufacturer can make statistics about the operation, use and behavior of the luminaires, which will allow him to better tailor the luminaire products to the needs of a user/operator. In addition or alternatively, the sensed data and/or the diagnostics data and/or said operating status data could also be transmitted to a user or operator, e.g. for information purposes and/or for telemanagement purposes.

The diagnostics and/or operating status data may comprise any one or more of the following data: an operating temperature of the luminaire, a level of vibrations undergone by the luminaire, a level of operating power of the luminaire, a number of switch-off and/or switch-on states of the luminaire, a number of operating light elements of the light source, an operating state of a surge protection device in the luminaire, an operating time of the luminaire, failure information of the luminaire such as a power supply failure signal, dimming profile data, light source failure data, etc.

Preferably, the light drive and control assembly comprises a dimming means configured for dimming the light source, and the programmable control means is configured for controlling the dimming means based on received data or data stored in the luminaire. The dimming means may be controlled e.g. in function of signals received from the antenna, in function of measured data, or in function of stored dimming profile data. More preferably, the light drive and control assembly has dimming means configured to use a dimming signal in accordance with standard protocols such as 0-10V, 1-10V or DALI.

According to an embodiment, the luminaire further comprises a localization unit such as a GPS receiver means, and the communication circuitry is configured for treating signals received by the localization unit. It is noted the localization unit may be provided in addition to or instead of the light sensor. Yet other embodiments do not comprise a light sensor or GPC receiver means. Preferably, the localization unit is also provided on the support substrate. In that manner, the localization of the luminaire can be communicated to other devices such as a central controller or adjacent luminaires, optionally in combination with other data such as sensed data. It is further noted that the luminaire may comprise, apart from a light sensor, various other sensors such as an image sensor (e.g. a camera), an audio sensor, an air quality sensor, a motion sensor, an environmental sensor sensing e.g. temperature, visibility, vibration, humidity, etc. The communication circuitry and/or the light drive and control assembly may then be further configured to use and/or transmit the data sensed by one or more of those additional sensors.

The antenna may or may not be highly directional. Also omnidirectional antennas may be used. The antenna may be any type of antenna, such as an RF antenna, a Bluetooth antenna, a near field communication antenna, etc. Also, there may be provided a plurality of antennas.

According to an embodiment, the housing comprises a first housing part with an opening and a second housing part comprising the electrically nonconductive portion. The second housing part is configured for closing the opening. In such an embodiment, the antenna may comprise a radiating part which is located at least partially within the second housing part. In an exemplary embodiment, the antenna comprises a radiating part which extends in an antenna plane which is located external with respect to the first housing part, at a distance below 15 mm, preferably below 13 mm, more preferably below 10 mm relative to a virtual plane covering the opening. Preferably, the antenna plane is substantially parallel to an inner surface of the second housing part. The antenna is arranged such that it can transmit and receive signals through the electrically nonconductive portion. By having an antenna plane substantially parallel to an inner surface of the second housing part which comprises the electrically nonconductive portion or which may be formed integrally in electrically nonconductive material, a good transmission and reception can be achieved.

According to an embodiment, the luminaire further comprises a fastening base fastened at the opening of the first housing part, wherein the second housing part is connected to the fastening base. Preferably, a circumferential portion of the first housing part—said circumferential portion extending around the opening in the first housing part—is positioned between the second housing part and the fastening base. Preferably, the second housing part is provided with a screw thread, and the fastening base is provided with a corresponding screw thread, such that the second housing part can be screwed into the fastening base, wherein preferably the circumferential portion of the first housing part extends between the second housing part and the fastening base.

Preferably, a sealing means is provided between the second housing part and the first housing part, e.g. between the circumferential portion of the first housing part and a corresponding circumferential portion of the second housing part. However, in other embodiments, the second housing part may be welded to the first housing part.

According to an embodiment, the support substrate is attached to the electrically nonconductive portion. According to an exemplary embodiment, the support substrate is provided with a central attachment means configured for cooperating with a corresponding central attachment means provided at an inner surface of the second housing part.

It is noted that the first housing part may be made from metal or plastic. Embodiments of the invention may be especially advantageous when the first housing part is from metal.

According to a preferred embodiment, a connecting assembly is provided between the communication assembly and the light drive and control assembly. Preferably, the light drive and control assembly is configured to receive power from a main power source, such as the mains, and to provide power to the communication assembly, and optionally to one or more other components which require to be powered such as the above-mentioned types of sensors. Typically, the power from the main power is converted into a suitable power signal for feeding the communication circuitry. More preferably, the light drive and control assembly is configured to generate a power supply failure signal when the power supply by the main power source fails, and to communicate said power supply failure signal to the communication assembly. To that end, the connecting assembly may comprise a line for transferring the power supply failure signal to the communication assembly. Alternatively, the light drive and control assembly may be configured to communicate the power supply failure signal wirelessly to the communication assembly. In that manner, the communication circuitry can take any required actions before the provision of power to the communication circuitry is completely cut off. Indeed, the power supply failure signal can be received by the communication circuitry before the provision of power to the communication circuitry is completely stopped, since there is a delay between the shut off of the main power source (typically the mains) and the complete shut off of the communication circuitry, because of energy stored in the light drive and control assembly. On the contrary, the transfer of a power failure signal when the light drive and control assembly detects that the power supply by the main power source (typically the mains) is interrupted, can be very fast. The transfer of the power failure signal may be realized in a simple manner, e.g. by setting the line at a different voltage level when it has been detected that the power supply from the main power source is interrupted. More in particular, the light drive and control assembly is configured such that it can detect and communicate the power failure before the provision of the power to the communication assembly is finished.

According to an embodiment, the connecting assembly comprises at least two power supply lines and/or at least two data communication lines. The power supply lines are used to feed power from the light drive and control assembly to the communication assembly. Preferably, the light drive and control assembly is configured to generate a supply voltage below 50V, more preferably below 26V, even more preferably below 15V, and most preferably between 2 and 5V, and to power the communication circuitry through the connecting assembly with this voltage. For example, the communication circuitry may be fed with a voltage of 3.3V. The at least two data lines can be used to communicate data between the communication assembly and the light drive and control assembly, such as data from the light sensor or data received by the antenna.

According to an embodiment, the connecting assembly may comprise a pluggable module, also called a dongle, configured to be plugged in a slot of the light drive and control assembly. The pluggable module typically includes connection means, but may also include other functionalities. Such other functionalities are described in more detail in patent applications WO 2017/220690, NL 2021706, and NL 2022358 in the name of the Applicant which are included herein by reference.

In a possible embodiment, the light sensor is provided on the support substrate, and there is provided at least one light guide for transmitting ambient light from the housing to the at least one light sensor. Preferably, each light guide comprises an optical wave guide, more preferably a fiber optic wave guide. The light guide may be rigid or flexible. The light guide may include at least one light filter, such as an infrared filter.

In a possible embodiment, the antenna is arranged on the support substrate. However, in other possible embodiments the antenna may be at least partially embedded in the electrically nonconductive portion of the housing.

In a possible embodiment, the housing comprises a lower surface through which light is emitted by the light source, and an upper surface opposite said lower surface. The electrically nonconductive portion through which the signals are transmitted or received is provided at least in the upper surface of the housing. However, it is noted that a large portion of the housing may be provided in electrically nonconductive material, but the signals transmitted or received by the antenna are preferably passed through the upper surface of the housing.

According to an embodiment, the housing is configured to provide an IP-protection of IP66, IP67 or IP 68 in accordance with DIN EN 60529.

According to an embodiment, the light source comprises a plurality of light emitting diodes.

According to a second aspect there is provided a luminaire comprising:
- a housing comprising an electrically nonconductive portion;
- a light source arranged in the housing;
- a light drive and control assembly configured for driving said light source;
- a communication assembly configured for communicating with the light drive and control assembly, said communication assembly comprising an antenna arranged and configured for receiving and/or transmitting communication signals through the electrically nonconductive portion;
- wherein the housing comprises a first housing part with an opening and a second housing part comprising the electrically nonconductive portion and closing the opening; wherein a radiating part of the antenna substantially extends in an antenna plane being located external with respect to the first housing part at a distance below 50 mm, preferably below 30 mm relative to a virtual plane covering the opening; wherein the second housing part is connected in a socket-free manner with the rest of the housing.

Preferred features disclosed above for the first aspect may also be used in the second aspect.

According to a third aspect, there is provided a luminaire comprising:
- a housing comprising an electrically nonconductive portion;
- a light source arranged in the housing;
- a light drive and control assembly configured for driving said light source;
- a communication assembly arranged in the housing, the communication assembly comprising:
  - an antenna arranged and configured for receiving and/or transmitting communication signals through the electrically nonconductive portion;
  - a support substrate,
  - a localization unit, such as a GPS receiving means, mounted on said support substrate; and
  - communication circuitry mounted on said support substrate and configured for treating signals received by the antenna and the localization unit, and for communicating those signals to the light drive and control assembly, and for treating signals to be transmitted by the antenna;
- wherein the electrically nonconductive portion through which the signals are transmitted or received is connected in a socket-free manner with the rest of the housing.

By providing a communication assembly which is integrated in the housing of a luminaire as defined above, there is provided a compact integrated connected luminaire in which communication functionalities (localization unit and communication circuitry) are adequately grouped. Compared to prior art solutions where the communication elements are provided in a module which is connected through a socket connection with the housing of a luminaire, embodiments of the invention have the advantage that the housing can be more compact whilst still allowing a good communication of data to and from the light drive and control assembly. Also according to the third aspect, by providing the housing with an electrically nonconductive portion through which electrical signals can be received and transmitted, and by integrating the communication assembly in the housing a truly connected luminaire is obtained. In other words, embodiments of the third aspect are by default enabled to transmit and/or receive signals to/from the outside.

Preferred features disclosed above for the first aspect may also be used in the third aspect.

According to a fourth aspect, there is provided a luminaire having the features of any one of the following clauses:

1. A luminaire comprising:
    a housing comprising an electrically nonconductive portion;
    a light source arranged in the housing;
    a light drive and control assembly configured for driving said light source;
    a communication assembly arranged in the housing, the communication assembly comprising:
        an antenna arranged and configured for receiving and/or transmitting communication signals through the electrically nonconductive portion; and
        communication circuitry configured for treating signals received by the antenna, and for communicating those signals to the light drive and control assembly, and for treating signals to be transmitted by the antenna;
    wherein the electrically nonconductive portion through which the signals are transmitted or received is connected in a socket-free manner with the rest of the housing and does not protrude out of the rest of the housing over more than 50 mm;
    wherein the light drive and control assembly comprises programmable control means configured for controlling and configuring the luminaire based on data in the received signals or data stored in the luminaire, and a dimming means configured for dimming the light source; wherein the programmable control means is configured for controlling the dimming means.
2. The luminaire of clause 1, wherein the communication assembly further comprises:
    a support substrate,
    a light sensor mounted on said support substrate or in or on the housing and configured for sensing a signal relating to ambient light levels; and
    wherein the communication circuitry is mounted on said support substrate and configured for treating signals received by the light sensor, and for communicating those signals to the light drive and control assembly.
3. The luminaire according to clause 1 or 2, further comprising a localization unit, such as a GPS receiver means, wherein the communication circuitry is configured for treating signals received by the localization unit, wherein preferably the localization unit is arranged on the support substrate.
4. The luminaire according to any one of the previous clauses, wherein the housing comprises a first housing part with an opening and a second housing part comprising the electrically nonconductive portion and closing the opening.
5. The luminaire according to the previous clause, wherein a radiating part of the antenna substantially extends in an antenna plane being located external with respect to the first housing part at a distance below 50 mm, preferably below 30 mm relative to a virtual plane covering the opening.
6. The luminaire according to the previous clause, wherein the antenna plane is substantially parallel to an inner surface of the second housing part.
7. The luminaire according to clause 4 or 6, wherein the distance between the antenna plane and the virtual plane is between 1 mm and 15 mm.
8. The luminaire according to any one of clauses 4-7, further comprising a fastening base in the opening of the first housing part, wherein the second housing part is connected to the fastening base.
9. The luminaire according to the previous clause, wherein the second housing part is provided with a screw thread, and wherein the fastening base is provided with a corresponding screw thread.
10. The luminaire according to any one of clauses 4-9, further comprising a sealing means between the second housing part and the first housing part.
11. The luminaire according to any one of the previous clauses, wherein the support substrate is attached to the electrically nonconductive portion.
12. The luminaire according to any one of clauses 4-11, wherein the support substrate is provided with a central attachment means configured for cooperating with a corresponding central attachment means provided at an inner surface of the second housing part.
13. The luminaire according to any one of the previous clauses, wherein the antenna is arranged on the support substrate.
14. The luminaire according to any one of clauses 1-12, wherein the antenna is at least partially embedded in the electrically nonconductive portion of the housing.
15. The luminaire according to any one of the previous clauses, wherein the housing comprises a lower surface through which light is emitted by the light source, and an upper surface opposite said lower surface.
16. The luminaire according to the previous clause, wherein the electrically nonconductive portion through which the signals are transmitted or received is provided at least in the upper surface of the housing.
17. The luminaire according to any one of the previous clauses, wherein the light drive and control assembly comprises control means configured for collecting sensed data and/or diagnostics data and/or operating status data related to components of the luminaire, and wherein the communication assembly is configured to transmit communication signals including said sensed data and/or said diagnostics data and/or said operating status data through the electrically nonconductive portion.
18. The luminaire according to the previous clause, wherein the diagnostics and/or operating status data comprise any one or more of the following data: an operating temperature of the luminaire, a level of vibrations undergone by the luminaire, a level of operating power of the luminaire, a number of switch-off and/or switch-on states of the luminaire, a number of operating light elements of the light source, an operating state of a surge protection device in the luminaire, an operating time of the luminaire, failure information of the luminaire such as a power supply failure signal, dimming profile data, light source failure data.

Preferred features disclosed above for the first aspect may also be used in the fourth aspect.

By providing a communication assembly which is integrated in the housing of a luminaire as defined in the fourth aspect, there is provided a compact integrated connected luminaire. Compared to prior art solutions where the communication elements are provided in a module which is connected through a socket connection with the housing of a luminaire, embodiments of the invention have the advantage that the housing can be more compact whilst still allowing a good communication of data to and from the light drive and control assembly. This is achieved by the electrically nonconductive portion through which the signals are transmitted or received that is connected in a socket-free manner with the rest of the housing (i.e. the communication assembly is not included in a separate module with an electrical plug that is pluggable in a corresponding socket provided on the housing) and does not protrude out of the rest of the housing over more than 50 mm, whilst at the same time including the communication assembly in the housing. Also according to the fourth aspect, by providing the housing with an electrically nonconductive portion through which electrical signals can be received and transmitted, and by integrating the communication assembly in the housing a truly connected luminaire is obtained.

According to a further aspect, there is provided a method for transmitting diagnostics and operating status data about a luminaire according to any one of the above-mentioned embodiments, said method comprising the following steps performed by the luminaire:
- collecting diagnostics and/or operating status data about one or more components of the luminaire;
- transmitting communication signals including said diagnostics and/or operating status data through the electrically nonconductive portion using the communication assembly.

By providing a method for automatically transmitting diagnostics and/or operating status data of a connected luminaire, the maintenance, the design, and the conception of the luminaire can be improved, thereby facilitating the respective tasks of a user, an operator, or a manufacturer.

The diagnostics and/or operating status data may comprise any one or more of the following data: an operating temperature of the luminaire, a level of vibrations undergone by the luminaire, a level of operating power of the luminaire, a number of switch-off and/or switch-on states of the luminaire, a number of operating light elements of the light source, an operating state of a surge protection device in the luminaire, an operating time of the luminaire, failure information of the luminaire such as a power supply failure signal, dimming profile data, light source failure data, etc. The above-mentioned data are preferably transmitted at regular time intervals, in order to derive trends on the operating status of the luminaire. For example, the above-mentioned data may be associated with time stamps.

The data of the operating temperature may comprise information on extreme temperatures encountered by the luminaire, and/or specific information on an operating temperature of the light drive and control assembly and/or of the communication assembly, etc. The data of the level of vibrations undergone may comprise maximal values of vibrations that the luminaire has undergone. The data of the level of operating power may enable to know the time period during which the luminaire has worked only at a certain percentage of its maximal operating power, e.g. 50 W, or in other words the time period during which the luminaire has been dimmed. Hence, an improved guarantee on the lifetime of the luminaire may be provided to a user or a customer based on the knowledge of said time period. The number of the operating light elements may be calculated based e.g. on a voltage data sent by the light drive and control assembly.

According to a further aspect, there is provided a use of a luminaire according to any one of the above-mentioned embodiments for transmitting diagnostics and operating status data about said luminaire.

Embodiments of the invention are particularly useful for outdoor luminaires. By outdoor luminaires, it is meant luminaires which are installed on roads, tunnels, industrial plants, campuses, parks, cycle paths, pedestrian paths or in pedestrian zones, for example, and which can be used notably for the lighting of an outdoor area, such as roads and residential areas in the public domain, private parking areas and access roads to private building infrastructures, etc.

BRIEF DESCRIPTION OF THE FIGURES

The accompanying drawings are used to illustrate presently preferred non-limiting exemplary embodiments of luminaires of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1A:
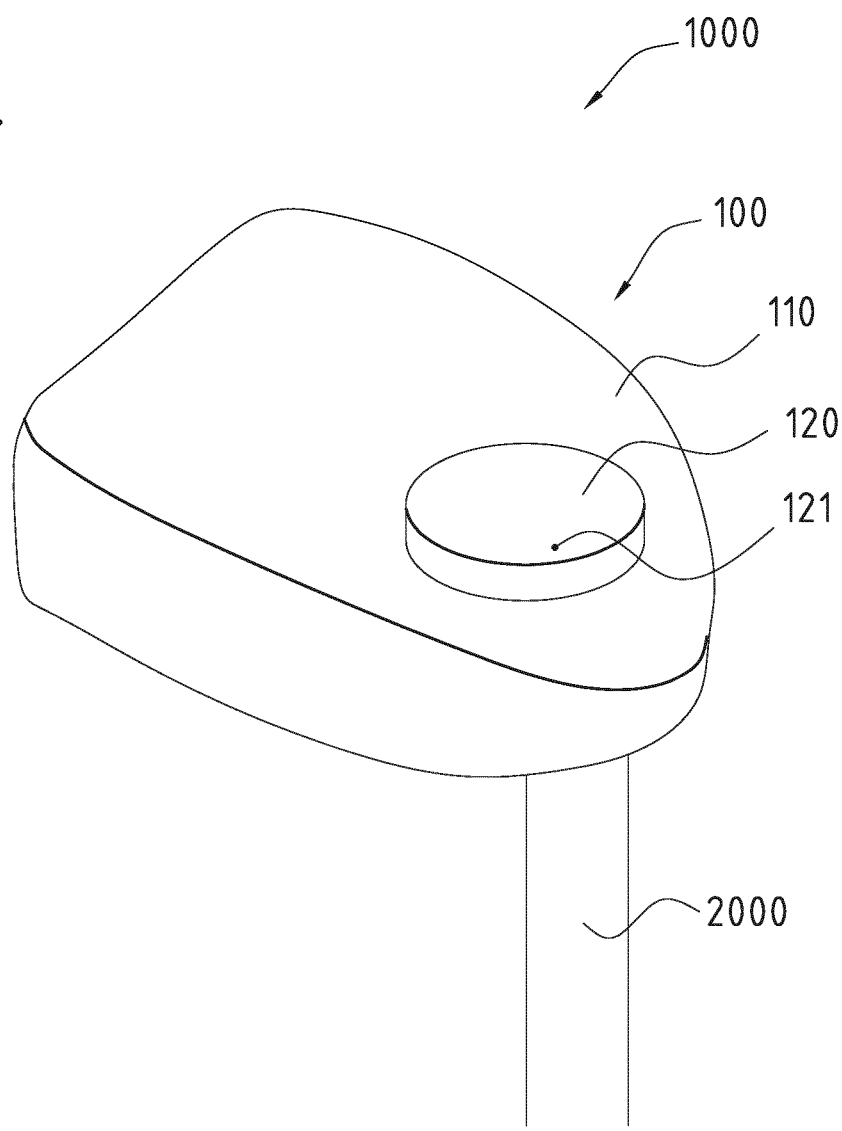
FIG. 1A illustrates schematically a perspective outer view of an exemplary embodiment of a luminaire.
Figure 1B:
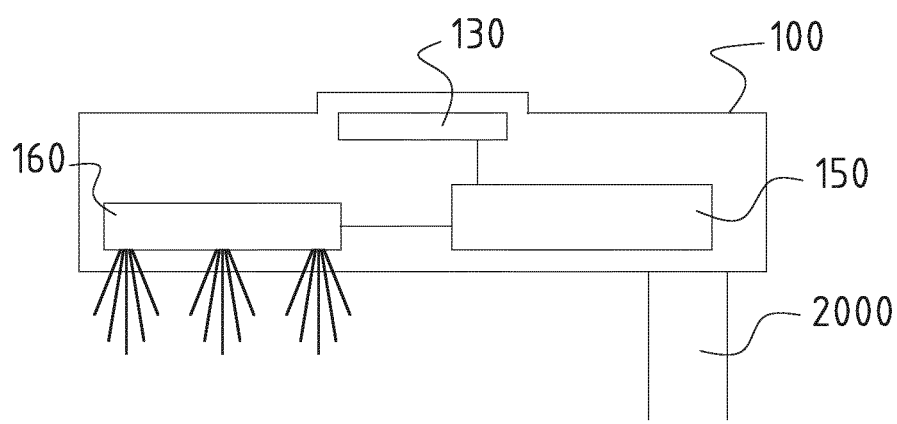
FIG. 1B illustrates schematically components of the embodiment of FIG. 1A.

FIGS. 1A and 1B illustrate a luminaire with a luminaire head 1000 and a support pole 2000. It is noted that the luminaire head 1000 may also be fixed directly to a wall or other type of support. The luminaire head 1000 comprises a housing 100 comprising an electrically nonconductive portion 121. In the illustrated embodiment of FIG. 1A, the housing 100 comprises a first housing part 110 and a second housing part 120, and the electrically nonconductive portion 121 is part of the second housing part 120. The second housing part 120 may be formed integrally of electrically nonconductive material or may comprise a portion of electrically nonconductive material. The first housing part 110 and the second housing part 120 form together a closed housing 100. Preferably, the housing 100 is configured to provide an IP protection class of IP66, IP67 or IP68 in accordance with DIN EN 60529. Typically, the luminaire head 1000 is sold as one integrated unit.

The luminaire head 1000 further comprises a light source 160 arranged in the housing 100, a light drive and control assembly 150 configured for driving the light source 160 and for performing various controlling functions. Preferably, and as illustrated in FIG. 1B, the light drive and control assembly 150 is also provided in the housing 100. Further, a communication assembly 130 is arranged in the housing 100.

Figure 2:
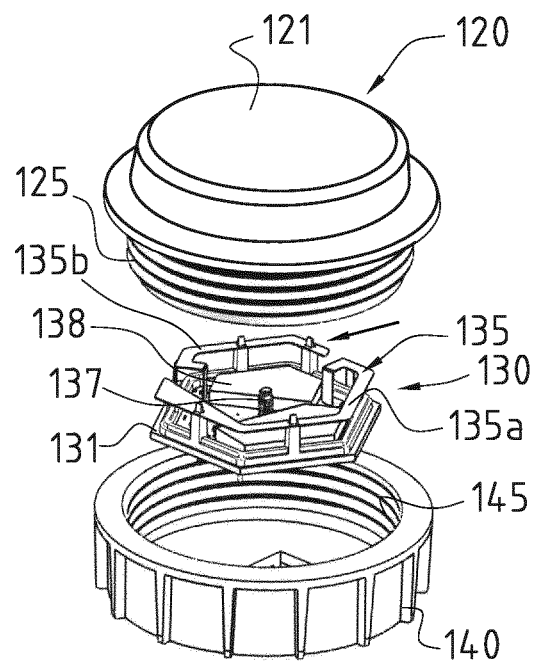
FIG. 2 illustrates schematically an exploded perspective view of a second housing part with a communication assembly for use in the embodiment of FIG. 1.

FIGS. 2-7 illustrate in more detail an exemplary embodiment of the various parts of the luminaire head 1000 of FIGS. 1A and 1B. FIG. 2 illustrates an exemplary embodiment of a possible communication assembly 130. The communication assembly 130 comprises an antenna 135, a support substrate 131, a light sensor (not shown), and communication circuitry 138. The antenna 135 is arranged and configured for receiving and transmitting communication signals through the electrically nonconductive portion 121 of the second housing part 120. In the illustrated embodiment, the antenna 135 is mounted on the support substrate 131. However, in other embodiments the antenna 135 may be integrated or embedded at least partially in a wall of the housing 100, e.g. in a wall of the second housing part 120. The antenna 135 may also be arranged on a surface of the housing 100, e.g. on a wall of the second housing part 120. For example, the antenna 135 may be arranged as an electrically conductive pattern or wire disposed on an inner surface of the second housing part 120. The antenna 135 may be configured for receiving RF signals. Also, more than one antenna 135 may be provided. Examples of antennas that may be provided are: a Bluetooth antenna, a NFC antenna, an antenna suitable for the LoRa communication protocol, etc. The light sensor (not shown) may be mounted on the support substrate 131 or may be integrated with the housing 100, e.g. mounted in or on the housing 100. The light sensor (not shown) is configured for sensing a signal relating to ambient light levels. Preferably, the light sensor is arranged such that it detects mainly ambient light, and little or no light from the light source 160. The communication circuitry 138 is mounted on the support substrate 131, and is configured for treating signals received by the antenna 135 and sensed by the light sensor, for communicating those signals to the light drive and control assembly, and for treating signals to be transmitted by the antenna 135.

Figure 3:
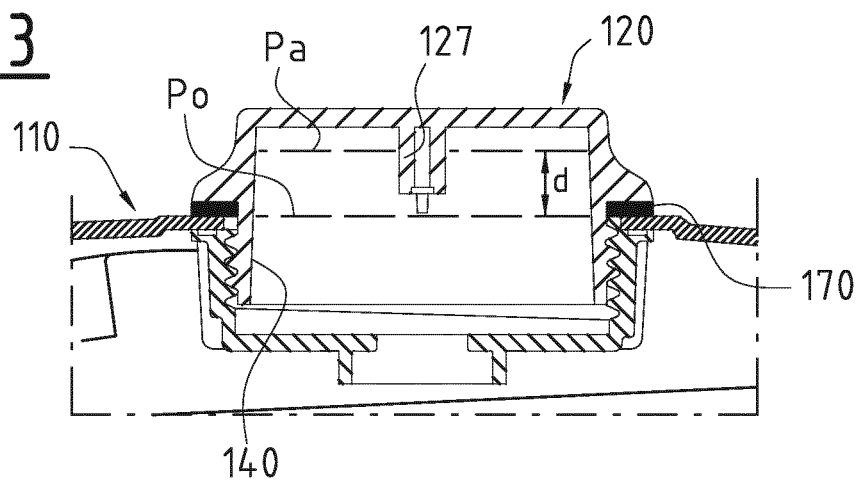
FIG. 3 illustrates schematically a cross-section through an upper surface of the luminaire of FIG. 1.
Figure 3A:
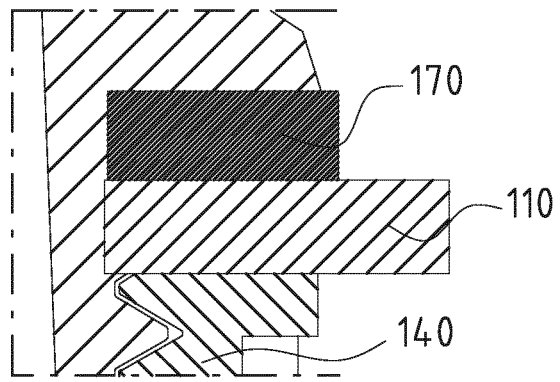
FIG. 3A is a detailed view of a portion of the cross-section of FIG. 3.
Figure 4:
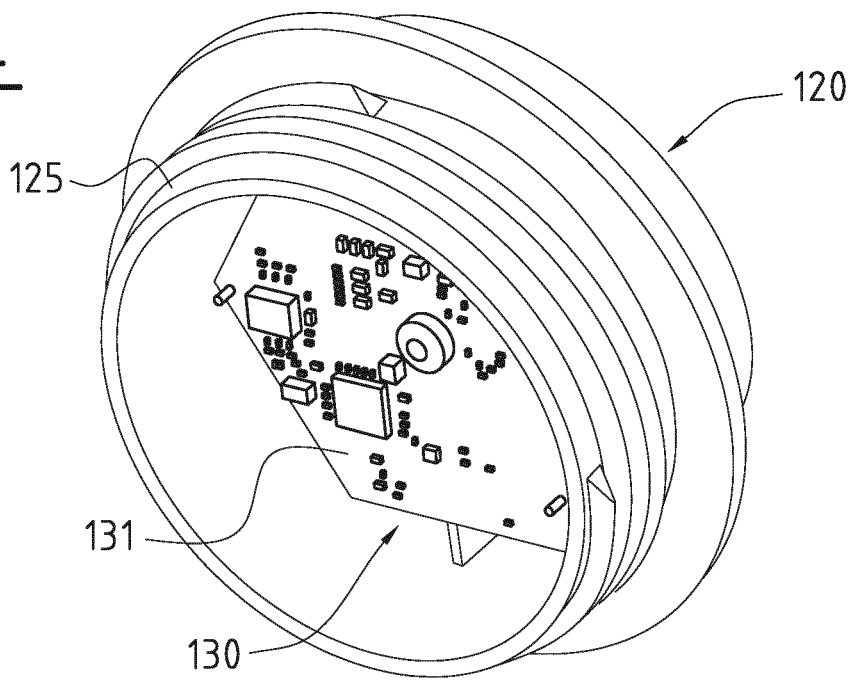
FIG. 4 is a schematic perspective view of the second housing portion of FIG. 2 with a communication assembly mounted in the second housing portion.

As illustrated in FIGS. 2, 3 and 4, a radiating part of the antenna 135 (here formed by two substantially flat portions 135a, 135b of the antenna 135) substantially extends in an antenna plane Pa being located external with respect to the first housing part 110 at a distance d below 50 mm, preferably below 30 mm relative to a virtual plane Po covering the opening 111. Preferably the antenna plane Pa is substantially parallel to an inner surface of the second housing part 120. More preferably, the distance d between the antenna plane Pa and the virtual plane Po is between 1 mm and 15 mm.

In the illustrated embodiment the support substrate 131 is provided with a central attachment means 137 configured for cooperating with a corresponding central attachment means 127 provided at an inner surface of the second housing part 120. However, the skilled person understands that other attachment means may be provided to suitably arrange the support substrate 131 in the housing 100.

The light drive and control assembly 150 may comprise one or more units. In a possible embodiment, the light source driving means and the control means may be integrated in one single light drive and control unit, but in other embodiments there may be provided a separate light driving unit and a controller. The light drive and control assembly 150 is configured for controlling and configuring the luminaire based on data in the signals received by the communication assembly 130. Preferably, the light drive and control assembly 150 comprises programmable control means configured for controlling and configuring the luminaire based on data in the received signals or data stored in the luminaire. The data may comprise various types of data used for configuring and controlling the luminaire, such as sensed data from neighboring luminaires, configuration profiles received from a central controller, diagnostics data, real time dimming data, etc. The data may relate to data for controlling dimming means, data for controlling the measurements performed by sensors, e.g. the at least one light sensor, etc. Said data may be transmitted at a given frequency, e.g. once a day, to the outside, e.g. to a cloud or a remote server. Preferably, the light drive and control assembly 150 comprises a dimming means configured for dimming the light source. The programmable control means is then preferably configured for controlling the dimming means based on received data or data stored in the luminaire. For example, the dimming means may be controlled in function of data received from the light sensor and/or based on data received from other luminaires or from other devices.

Also, the programmable control means may be configured for controlling the transmitting of data from the luminaire to the outside, e.g. to a remote server or a neighboring luminaire. For example, data sensed by a sensor of the luminaire may be transmitted at a given frequency, e.g. once a day.

According to a preferred embodiment, the light drive and control assembly comprises control means (optionally integrated with the previously mentioned programmable control means) which are configured for automatically collecting sensed data and/or diagnostics data and/or operational status data related to components of the luminaire, and the communication assembly 130 is configured to transmit communication signals including said sensed data and/or said diagnostics data and/or said operating status data through the electrically nonconductive portion 121 to a remote device (either directly or indirectly through one or more other luminaires and/or gateways). In that manner, the luminaire can be sold as a "connected" luminaire, irrespective of whether a user/operator of the luminaire wishes to control the luminaire through a remote device. This will allow a luminaire manufacturer to analyze the operation, use and behavior of the luminaires based on the sensed data and/or diagnostic data and/or operational status data which is transmitted automatically by the "connected" luminaire to a remote server. In that manner, the luminaire manufacturer can make statistics about the operation, use and behavior of the luminaires, which will allow him to better tailor the luminaire products to the needs of a user/operator.

The diagnostics and/or operating status data may comprise any one or more of the data mentioned above in the summary.

The communication assembly 130 may further comprise a localization unit (not shown), such as a GPS receiver means. The communication circuitry 138 may then be configured for treating signals received by the localization unit and for communicating those signals to the light drive and control assembly 150 and/or to other devices such as other luminaires or a central controller. Preferably, the localization unit is also provided on the support substrate 131. Preferably, the localization unit is also arranged such that it can receive signals through the electrically nonconductive portion 121.

Figure 5:
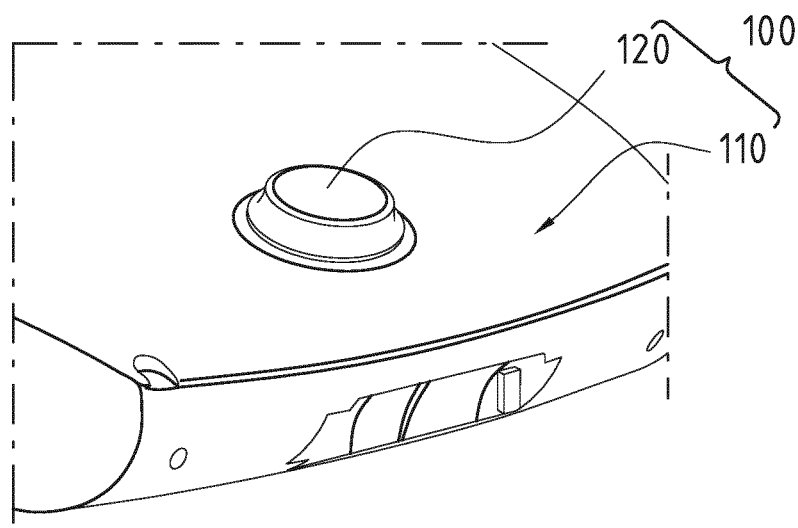
FIG. 5 is a detailed perspective view of a portion of the luminaire of FIG. 1.
Figure 5A:
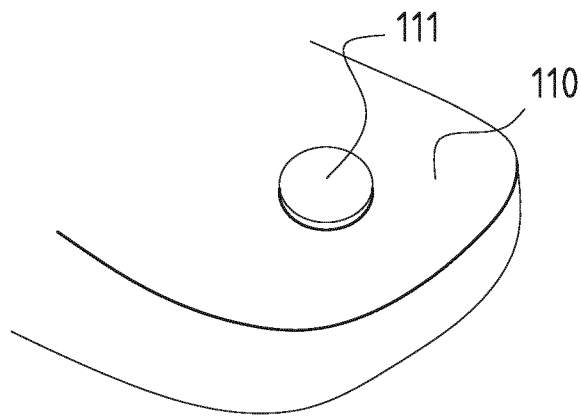
FIG. 5A illustrates the same portion without the second housing part.

In the illustrated embodiment of FIGS. 2-7, the housing 100 comprises a first housing part 110 with an opening 111, see FIGS. 5 and 5A, and a second housing part 120 comprising the electrically nonconductive portion 121. The second housing part 120 closes the opening 111 in the first housing part 110. As illustrated in FIG. 3, the second housing part 120 is arranged in a fastening base 140 of the housing 100. To provide a housing 100 with an adequate IP protection, a sealing means 170 is inserted between the second housing part 120 and the first housing part 110. In the illustrated embodiment, a circumferential wall portion of the first housing part 110 and the sealing means 170 extend between the second housing part 120 and the fastening base 140. The second housing part 120 is provided with an external screw thread 125, and the fastening base 140 is provided with a corresponding internal screw thread 145. The fastening base 140 is fastened to the first housing portion 110 by screwing the second housing part 120 in the fastening base 140. Optionally, the fastening base 140 may be attached to the circumferential portion (surrounding the opening 111) of the first housing part 110.

Figure 6:
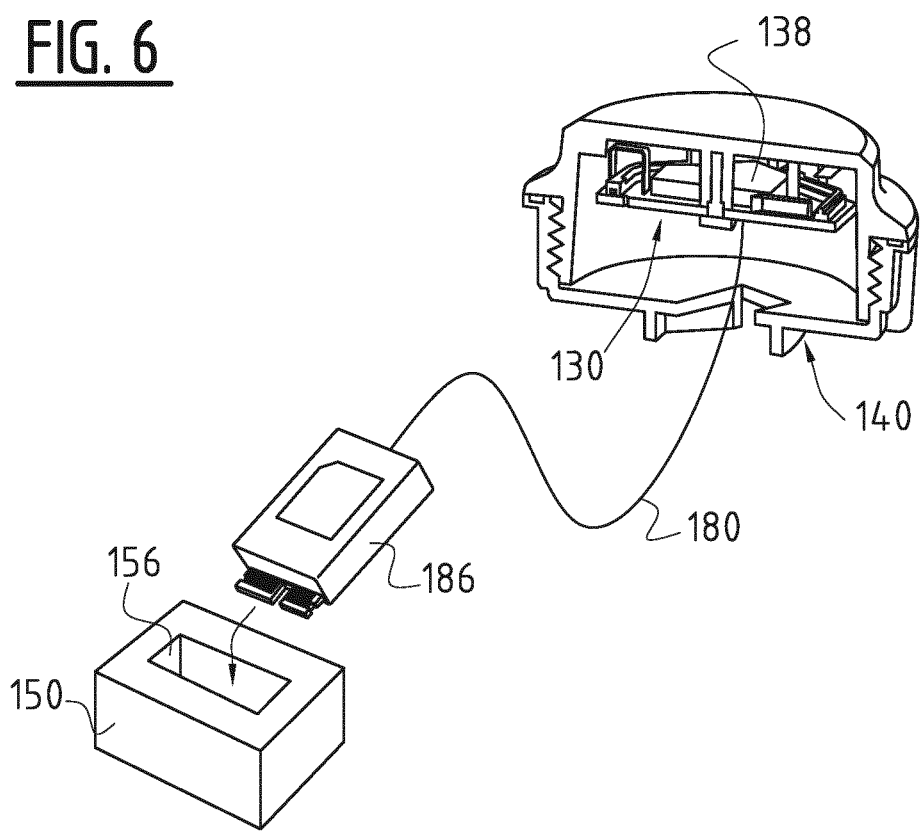
FIG. 6 is a perspective sectional view similar to the view of FIG. 3 illustrating the connection of the communication assembly to the light drive and control assembly.
Figure 10:
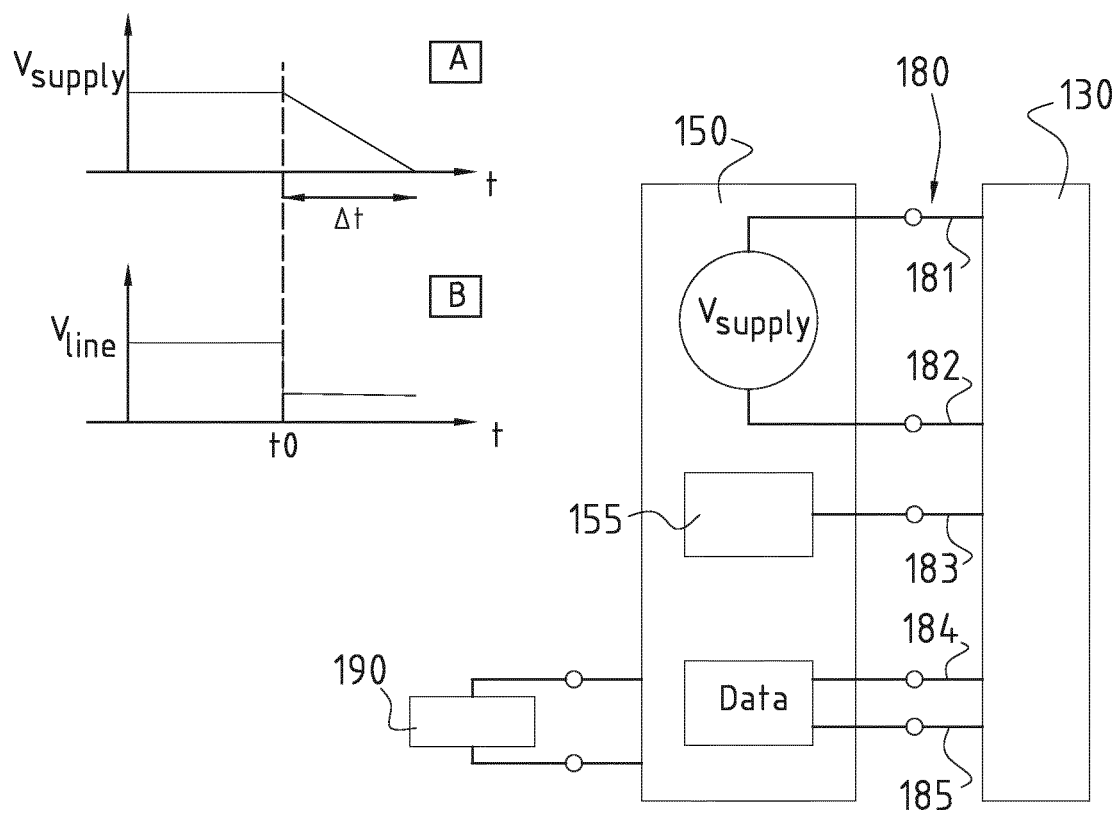
FIG. 10 illustrate schematically an exemplary embodiment of a portion of a luminaire according to the invention.

As illustrated in FIGS. 6 and 10, the luminaire further comprises a connecting assembly 180 between the communication assembly 130 and the light drive and control assembly 150. The connecting assembly 180 may comprise a plurality of lines, e.g. five, six or more lines. Preferably, the lines comprise at least two power supply lines 181, 182 and at least two data communication lines 184, 185, as illustrated in FIG. 10. More preferably, the plurality of lines also comprises a power failure communication line 183 for transferring a power supply failure signal, as illustrated in FIG. 10. In another embodiment than that illustrated in FIG. 10, there may only be provided at least two power supply lines. The light drive and control assembly 150 may send the power supply failure signal to the communication assembly 130 wirelessly, or via the power supply lines 181, 182. For example, the light drive and control assembly may provide the communication assembly 130 with a voltage changing periodically at a given frequency between a first voltage value, e.g. 22V, and a second voltage value, e.g. 26V. When the power supply from the main power supply 190 fails, the light drive and control assembly 150 may communicate the power supply failure signal to the communication assembly 130 by continuously providing the communication assembly 130 with the same voltage value, e.g. 22V, instead of said periodically changing voltage. Hence, the power supply failure signal may be modulated on a power signal on one of the power supply lines 181, 182. In yet another embodiment, there may only be provided at least two power supply lines 181, 182 and at least two data communication lines 184, 185. The light drive and control assembly 150 may be configured to communicate the power supply failure signal to the communication assembly 130 via one of the data communication lines 184, 185. For example, the power supply failure signal may be modulated on one of the data communication lines 184, 185.

In a preferred embodiment, the light drive and control assembly 150 is configured to receive power from a main power source (typically the mains) and to provide a suitable power supply voltage $V_{supply}$ to the communication assembly 130. In such an embodiment, the light drive and control assembly 150 may be configured to generate a power supply failure signal when the power supply to the light drive and control assembly fails. The light drive and control assembly 150 may then further be configured to communicate the detection through one of the lines 181, 182, 183 of the connecting assembly 180 to the communication assembly. For example, this can be done by changing the voltage level on a dedicated line 181, 182, 183 of the connecting assembly 180. In that manner, the communication assembly 130 can be informed in a fast manner about a power failure, and can take appropriate action such as storing critical data, setting the communication assembly in a power-off mode or a stand-by mode, sending a signal to a remote device, etc., before the power provision to the communication assembly 130 is stopped completely. This is schematically illustrated in FIG. 10. The connecting assembly 180 comprises five lines: two power supply lines 181, 182, two data communication lines 184, 185, and a power failure communication line 183. When the main power supply 190 fails to provide power to the light drive and control assembly 150 at a point in time t0, the supply voltage $V_{supply}$ provided to the communication assembly 130 will slowly drop as illustrated in diagram A of FIG. 10. The light drive and control assembly 150 is configured to detect a power failure using a suitable detection means 155 and is configured to generate a power supply failure signal on line 183. This may be done e.g. by changing the voltage level on line 183. In the above-mentioned other embodiment where there may only be provided at least two power supply lines, the light drive and control assembly 150 may be configured to detect a power failure using a suitable detection means 155 and may be configured to generate a power supply failure signal on one of lines 181, 182. This may be done e.g. by changing the voltage level on one of lines 181, 182. In the above-mentioned other embodiment where there may only be provided at least two power supply lines 41, 42 and at least two data communication lines 184, 185, the light drive and control assembly 150 may be configured to detect a power failure using a suitable detection means 155 and may be configured to generate a power supply failure signal on one of lines 184, 185. This may be done e.g. by changing the voltage level on one of lines 184, 185. As illustrated in diagram B of FIG. 10, such a signal can be transferred in a very fast manner to the communication circuitry 130, so that the communication circuitry 130 can take appropriate action within a delay time Δt before the power supply is completely finished, see diagram A of FIG. 10.

Preferably, the light drive and control assembly 150 is configured to generate a supply voltage $V_{supply}$ below 50V, more preferably below 26V, even more preferably between 2 and 5V, e.g. 3.3V. In other words, the voltage difference between lines 181 and 182 is preferably below 50V.

Figure 7:
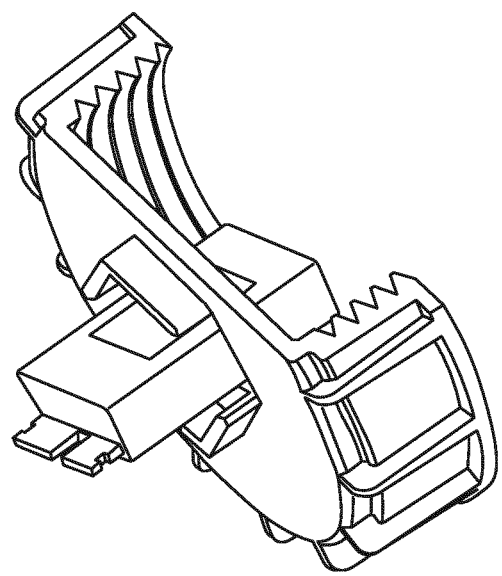
FIG. 7 is a perspective view illustrating the mounting of a dongle in the fastening base of the exemplary embodiment of FIG. 2.

As illustrated in FIGS. 6 and 7, the connecting assembly 180 may comprise a pluggable module 186 configured to be plugged in a slot 156 of the light drive and control assembly 150. The pluggable module 186 typically includes connection means, but may also include other functionalities. Such other functionalities are described in more detail in patent applications WO 2017/220690, NL 2021706, and NL 2022358 in the name of the Applicant which is included herein by reference.

In the illustrated embodiments, the electrically nonconductive portion 121 through which the signals are transmitted or received is connected in a socket-free manner (i.e. without an electrical socket) with the rest of the housing 100. More in particular the second housing part 120 is not fitted using an electrical socket-connection on the first housing part 110. Preferably, the second housing part 120 does not protrude out of the rest of the first housing part 110 over more than 50 mm. More generally, preferably, the electrically nonconductive portion 121 through which the signals are transmitted or received does not protrude out of the rest of the housing 100 over more than 50 mm.

Figure 8:
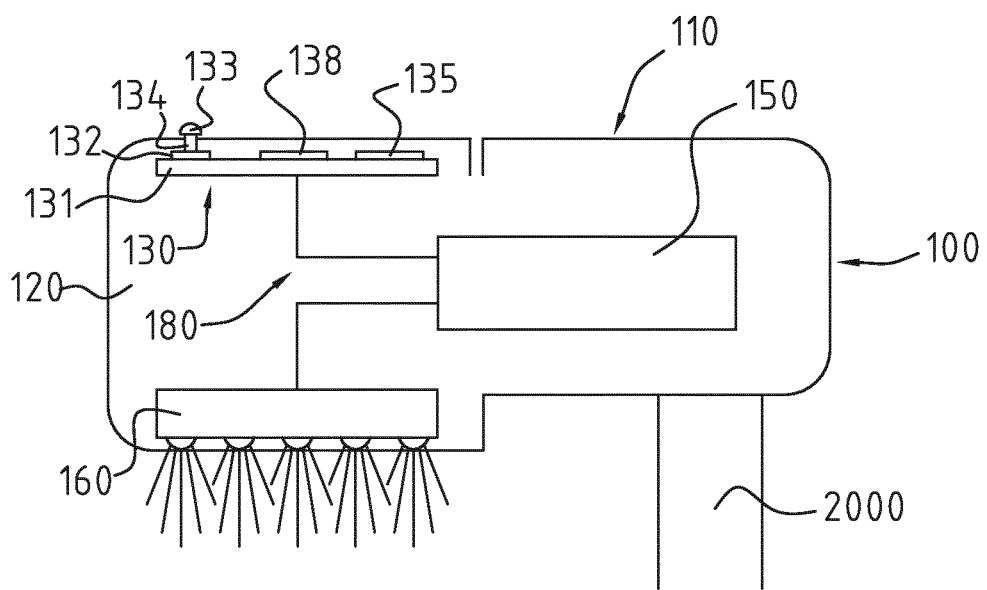
FIGS. 8 and 9 illustrate schematically other exemplary embodiments of luminaires according to the invention.
Figure 9:
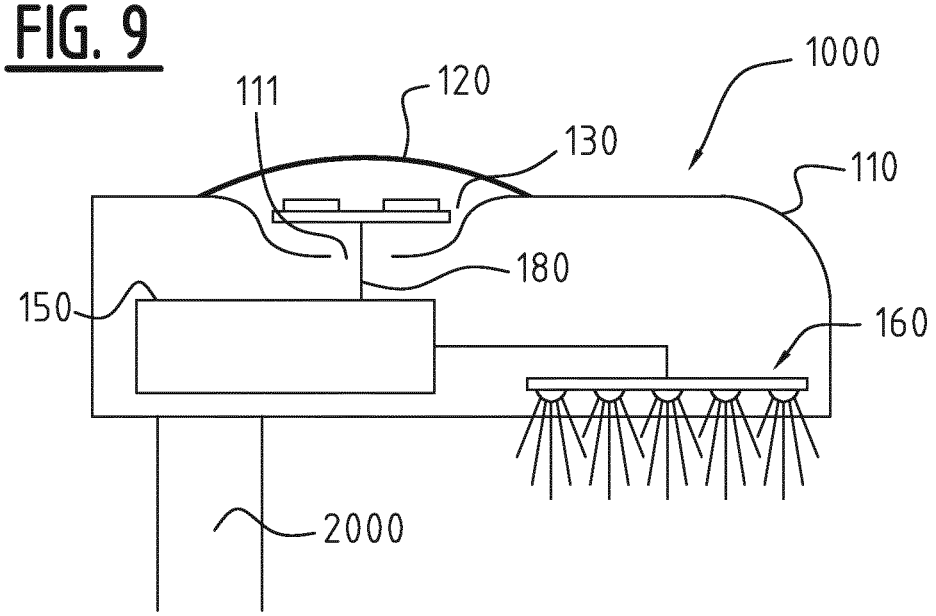

FIGS. 8 and 9 illustrate variants of the embodiment of FIGS. 1A and 1B, and the same reference numerals have been used to refer to the same or similar parts. In the embodiment of FIG. 8, the first housing part 110 may be a metal part and the second housing part 120 is a cover part extending both at the bottom and at the top of the housing. This cover part 120 may be made of plastic and comprises a transparent portion allowing light of the light source 160 to pass through. The communication assembly 130 comprises a support substrate 131 with communication circuitry 138, an antenna 135, and a light sensor 132. Optionally, a lens portion 133 may be provided in the second housing part 120 and the light sensor 132 may be connected to the lens portion 133 with a light guide 134. In the embodiment of FIG. 9, the first housing part 110 comprises a recessed part with an opening 111 in an upper surface of the housing part 110 creating a chamber for receiving the communication assembly 130. The communication assembly 130 may be embodied according to any one of the above disclosed embodiments. In some embodiments the light sensor may be omitted. The second housing part 120 extends over the recess part to form a closed housing 100.

In the illustrated embodiments of FIGS. 1B, 8, and 9, the housing 100 comprises a lower surface through which light is emitted by the light source 160, and an upper surface opposite said lower surface. The electrically nonconductive portion 121 through which the signals are transmitted or received is provided in the upper surface of the housing 100.

As illustrated in FIG. 8, a large portion of the housing 100 may be provided in electrically nonconductive material, said portion comprising the lower and upper surfaces and a connection surface connecting said lower and upper surfaces. However, the signals transmitted or received by the antenna 135 are preferably passed through the upper surface of the housing 100, as illustrated in FIGS. 1B, 8, and 9. In these embodiments, the support substrate 131 is substantially parallel to the upper surface of the housing 100.

Whilst the principles of the invention have been set out above in connection with specific embodiments, it is to be understood that this description is merely made by way of example and not as a limitation of the scope of protection which is determined by the appended claims.

The invention claimed is:

1. A luminaire comprising:
   a housing comprising an electrically nonconductive portion;
   a light source arranged in the housing;
   a light drive and control assembly configured for driving said light source;
   a communication assembly arranged in the housing, the communication assembly comprising:
   an antenna arranged and configured for receiving and/or transmitting communication signals through the electrically nonconductive portion;
   a support substrate, and
   communication circuitry mounted on said support substrate and configured for treating signals received by the antenna, and for communicating those signals to the light drive and control assembly, and for treating signals to be transmitted by the antenna;
   wherein the electrically nonconductive portion through which the signals are transmitted or received is connected in a socket-free manner with the rest of the housing;
   further comprising a connecting assembly between the communication assembly and the light drive and control assembly, wherein the connecting assembly comprises a pluggable module configured to be plugged in a slot of the light drive and control assembly.

2. The luminaire according to claim 1, further comprising a light sensor mounted on said support substrate or in or on the housing and configured for sensing a signal relating to ambient light levels; wherein the communication circuitry is configured for treating signals from the light sensor.

3. The luminaire according to claim 2, further comprising at least one light guide for transmitting ambient light from the housing to the at least one light sensor.

4. The luminaire according to claim 1, wherein the light drive and control assembly comprises programmable control means configured for controlling and configuring the luminaire based on data in the received signals;
   wherein preferably the light drive and control assembly comprises a dimming means configured for dimming the light source, and wherein the programmable control means is configured for controlling the dimming means.

5. The luminaire according to claim 1, wherein the light drive and control assembly comprises control means configured for collecting sensed data, diagnostics data, or operating status data related to components of the luminaire, and wherein the communication assembly is configured to transmit communication signals including said sensed data, said diagnostics data, or said operating status data through the electrically nonconductive portion;
   wherein preferably the diagnostics or operating status data comprise any one or more of the following data: an operating temperature of the luminaire, a level of vibrations undergone by the luminaire, a level of operating power of the luminaire, a number of switch-off or switch-on states of the luminaire, a number of operating light elements of the light source, an operating state of a surge protection device in the luminaire, an operating time of the luminaire, failure information of the luminaire such as a power supply failure signal, dimming profile data, or light source failure data.

6. The luminaire according to claim 1, further comprising a localization unit, wherein the communication circuitry is configured for treating signals received by the localization unit, wherein the localization unit is arranged on the support substrate.

7. The luminaire according to claim 1, wherein the housing comprises a first housing part with an opening and a second housing part comprising the electrically nonconductive portion and closing the opening;
   wherein preferably a radiating part of the antenna substantially extends in an antenna plane being located external with respect to the first housing part at a distance below 30 mm relative to a virtual plane covering the opening.

8. The luminaire according to claim 7, wherein the antenna plane is substantially parallel to an inner surface of the second housing part; or
   wherein the distance between the antenna plane and the virtual plane is between 1 mm and 15 mm.

9. The luminaire according to claim 7, further comprising a fastening base in the opening of the first housing part, wherein the second housing part is connected to the fastening base;
  wherein preferably the second housing part is provided with a screw thread, and wherein the fastening base is provided with a corresponding screw thread.

10. The luminaire according to claim 7, further comprising a sealing means between the second housing part and the first housing part.

11. The luminaire according to claim 7, wherein the support substrate is attached to the electrically nonconductive portion; or
  wherein the support substrate is provided with a central attachment means configured for cooperating with a corresponding central attachment means provided at an inner surface of the second housing part.

12. The luminaire according to claim 1,
  wherein the light drive and control assembly is configured to receive power from a main source, to provide power to the communication assembly, to generate a power supply failure signal when the power supply from the main source fails, and to communicate said power supply failure signal to the communication assembly.

13. The luminaire according to claim 12, wherein the connecting assembly comprises a line for transferring the power supply failure signal; or
  wherein the connecting assembly comprises at least two power supply lines; or
  wherein the connecting assembly comprises at least two data communication lines.

14. The luminaire according to claim 12, wherein the light drive and control assembly is configured to generate a supply voltage, and to power the communication assembly through the connecting assembly with said supply voltage.

15. The luminaire according to claim 1, wherein the antenna is arranged on the support substrate; or
  wherein the antenna is at least partially embedded in the electrically nonconductive part of the housing.

16. The luminaire according to claim 1, wherein the housing comprises a lower surface through which light is emitted by the light source, and an upper surface opposite said lower surface;
  wherein preferably the electrically nonconductive portion through which the signals are transmitted or received is provided at least in the upper surface of the housing.

17. The luminaire according to claim 1, wherein the housing is configured to provide an IP protection class of IP66, IP67 or IP68 in accordance with DIN EN 60529; or
  wherein the light drive and control assembly is arranged in the housing.

18. A luminaire comprising:
  a housing comprising an electrically nonconductive portion;
  a light source arranged in the housing;
  a light drive and control assembly configured for driving said light source;
  a communication assembly configured for communicating with the light drive and control assembly, said communication assembly comprising an antenna arranged and configured for receiving and/or transmitting communication signals through the electrically nonconductive portion and a support substrate;
  wherein the housing comprises a first housing part with an opening and a second housing part comprising the electrically nonconductive portion and closing the opening; wherein the second housing part is connected in a socket-free manner with the rest of the housing;
  further comprising a fastening base in the opening of the first housing part, wherein the second housing part is connected to the fastening base;
  wherein the support substrate is attached to the electrically nonconductive portion; and
  wherein the antenna is arranged on the support substrate.

19. The luminaire according to claim 18, wherein the communication assembly comprises:
  a light sensor mounted on said support substrate or in or on the housing and configured for sensing a signal relating to ambient light levels, and
  communication circuitry mounted on said support substrate and configured for treating signals received by the antenna and the light sensor, and for communicating those signals to the light drive and control assembly, and for treating signals to be transmitted by the antenna.

20. The luminaire according to claim 18, wherein a radiating part of the antenna substantially extends in an antenna plane being located external with respect to the first housing part at a distance below 50 mm, preferably below 30 mm relative to a virtual plane covering the opening.

* * * * *